US008695097B1

(12) United States Patent
Mathes et al.

(10) Patent No.: US 8,695,097 B1
(45) Date of Patent: Apr. 8, 2014

(54) SYSTEM AND METHOD FOR DETECTION AND PREVENTION OF COMPUTER FRAUD

(75) Inventors: Chris Mathes, Harrisburg, NC (US);
Bryan Hall, Charlotte, NC (US);
Michael Toth, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1231 days.

(21) Appl. No.: 11/895,888

(22) Filed: Aug. 28, 2007

(51) Int. Cl.
*H04L 29/06* (2006.01)

(52) U.S. Cl.
USPC .................................. 726/25; 726/6

(58) Field of Classification Search
USPC ........................... 726/5, 6, 7, 23, 25
See application file for complete search history.

(56) References Cited

U.S. PATENT DOCUMENTS

| 2006/0156389 | A1* | 7/2006 | Brown et al. ................ 726/5 |
| 2007/0006305 | A1* | 1/2007 | Florencio et al. .......... 726/22 |
| 2007/0044020 | A1* | 2/2007 | Iwatsu et al. .............. 715/700 |
| 2007/0245343 | A1* | 10/2007 | Shannon et al. ........... 717/174 |
| 2008/0046913 | A1* | 2/2008 | Dear ........................ 725/24 |

* cited by examiner

*Primary Examiner* — Edward Zee
(74) *Attorney, Agent, or Firm* — K&L Gates LLP

(57) ABSTRACT

In a networked computer system, a user accesses a webserver via a web interface presenting credentials comprising a user identification. The webserver is communicatively connected to an application server. If fraud with respect to the user identification is detected, the application server sends a notification or alert to add the user identification to a list of compromised user identifications. The system also comprises a database for storing the list of compromised user identifications on a computer. Another category of user identifications is created referred to as phish phood which is comprised of fabricated user identifications.

24 Claims, 2 Drawing Sheets

SYSTEM AND METHOD FOR DETECTION AND PREVENTION OF COMPUTER FRAUD

FIELD OF THE INVENTION

The present invention relates to a system and method for detection and prevention of computer fraud.

BACKGROUND OF THE INVENTION

As the use of the internet to perform business and financial transactions matures, so does the threat of fraud against those processes. The attack upon financial institutions has increased significantly since online applications have become available for users to view account data and perform actions upon their accounts. The primary threat to customers continues to become more prominent as hackers refine their skills of compromising customer credentials through complex hacking operations.

Fraudsters have become quite prolific in tricking individuals into giving up their private credential information through social engineering. In other words, taking advantage of common social scenarios by posing as an authorized participant with the expectation of tricking a person into sharing sensitive information. Most commonly, individuals have fallen victim to 'phishing' scams. For example, an individual is tricked by an email that looks to have been sent from a financial institution of whom the individual is a customer. In the email, there is a link to a malicious website that has been branded to look as if it is the home page of the financial institution. Believing that it is the correct website location, the individual enters his or her private information, which is collected by the fraudster. The fraudster will then use those credentials to login to the individual's account on the website home page of the real financial institution.

In addition to phishing, financial institutions have recently become victimized by the recent trend toward botnets. Botnets, also referred to as Remote Access Trojans (RATS), are sophisticated computer software applications that run on an unprotected personal computer (PC). Many times, these Trojans will include a key-logger, which collects credentials for online access to individuals' accounts when a browser is directed to a subset of financial institutions. Thus, there is a rise in activity of automated attacks against the online presence of financial institutions.

Credentials for online access that have been compromised typically go through a life cycle in the "black market." The credentials are validated after they are stolen. The fraudster will login using the credentials simply to verify the credentials are correct. Typically, they are then used again to login to the victim's account to get an understanding of the available assets on the account for fraud. The credentials are then commonly sold, possibly to multiple buyers. This, coupled with the continuation of this life cycle into multiple logins by the final purchasers, produces a pattern of multiple accesses after a credential set is stolen. Also, these authentication requests are typically grouped into a batch process sharing one browser session.

There is a need to leverage this patterning to further protect customers of financial institutions, for example, who may otherwise fall victim to fraud.

Thus, there is a need for a system and method that is capable of more completely identifying the subset of a customer base who has fallen victim to these social engineering threats. In addition, there is a need for a method that provides data that can be used to identify additional channels, such as Internet Service Providers, IP addresses, and physical locations, where fraud may be unknowingly originating.

SUMMARY OF THE INVENTION

The system and method of the present invention relates to detection and prevention of computer fraud.

In accordance with the system and method of the present invention, a user accesses a webserver via a web interface, such as a computer having interne access, presenting credentials comprising a user identification. The webserver is communicatively connected to an application server. If the user identification is identified as compromised, the application server sends a notification or alert to add the compromised user identification to a list of compromised user identifications referred to herein as the Blue List. The system also comprises a database for storing the list of compromised user identifications on a computer.

In accordance with the system and method of the present invention, when a user provides a user identification and password and requests access to the webserver, for example for accessing a financial account, the provided user identification is checked against the Blue List. Access is denied to the user if the provided user identification is on the Blue List.

In accordance with the system and method of the present invention, a request can be received from a user using a web interface to assign a proposed user identification to the user. The proposed user identification is checked against a list of compromised user identifications stored on a computer, and the proposed user identification is assigned to the user provided it is not on the list of compromised user identifications.

Also, in accordance with the system and method of the present invention is the creation of a second category of user identifications referred to herein as 'phish phood.' Phish phood is a category of fabricated user IDs that are present on the Blue List.

In accordance with the method of the present invention, a party, such as a financial institution, fabricates a user identification and adds it to the list of compromised user identifications. A prefix is assigned to the fabricated user identification to identify the user identification as phish phood. A unique identifier is appended to the fabricated user identification, typically for tracking purposes. The fabricated user identification is entered as phish phood into a phishing website. The party who fabricated the user ID monitors any requests for access to its webserver by another party using the fabricated user identification as its credentials.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

Figure 1:
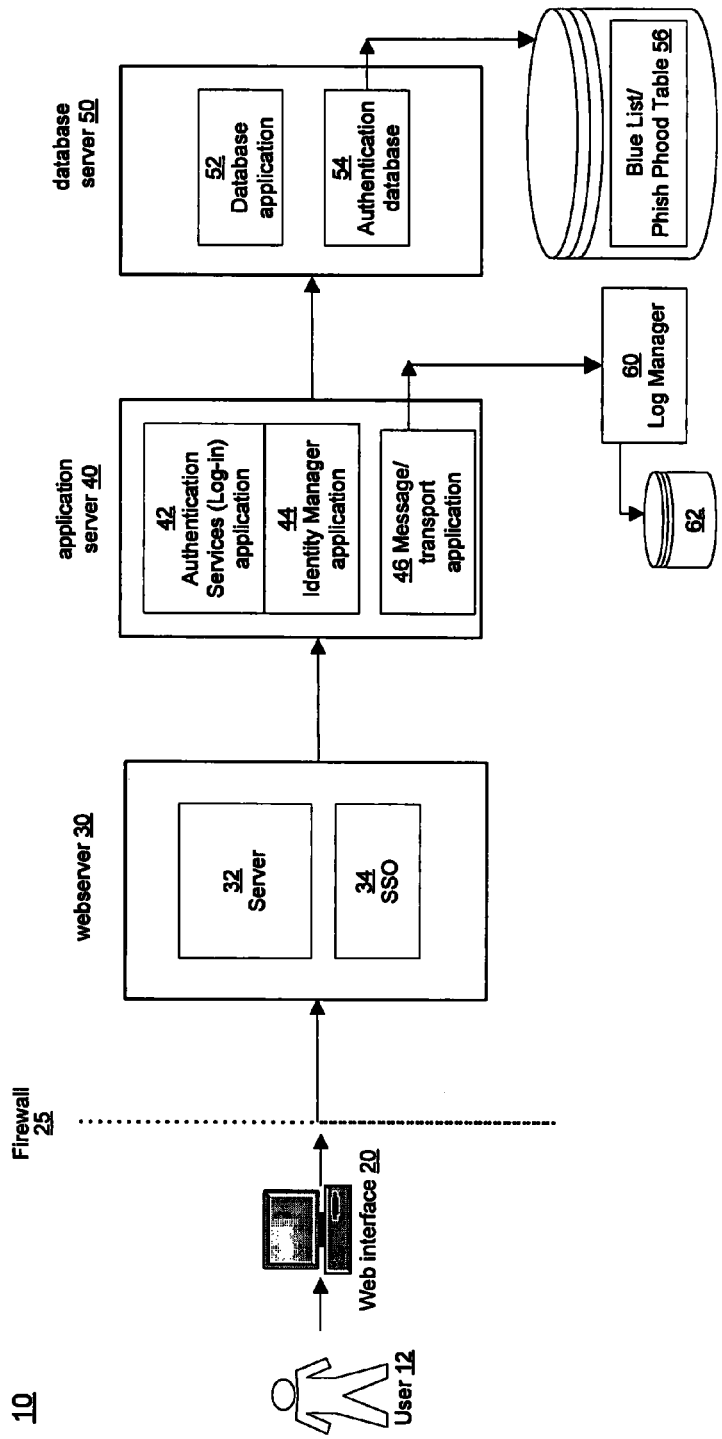
FIG. 1 is a diagram illustrating the overall environment in which the system and method of the present invention operates.

The following description of the embodiments of the present invention is merely exemplary in nature and is in no way intended to limit the invention, its application, or uses. The present invention is directed to a system and method of detection and prevention of computer fraud including unauthorized authentication to computer software applications. The present invention has broad potential application and utility, which is contemplated to be adaptable to a wide range of entities for detecting and preventing fraudulent activity and limiting access to applications and information within a networked computer system. For example, it is contemplated that the system and method of the present invention would be beneficial for use by any business or financial institution including, but without limitation, a bank, credit union, and savings and loan that provides online banking, investment, mortgage services, and/or other financial services. Additionally, it is contemplated that the system and method of the present invention would be equally beneficial, for example, for a retail business that provides online retail services. Further, the system and method of the present invention would be beneficial to any entity maintaining secure applications and information that are accessed by third-party computers or users. The following description is provided herein solely by way of example for purposes of providing an enabling disclosure of the invention, but does not limit the scope or substance of the invention.

The system and method of the present invention are directed to detecting fraud by identifying fraud patterns. A validation stage in a stolen credential life cycle occurs after the credentials become compromised. As indicated above, the credentials are often sold through a black market (commonly over a combination of bulletin boards and internet rely chats) to, possibly, multiple buyers. Credentials are typically used at least twice after they are stolen. Thus, the system and method of the present invention may be used by a financial institution, for example, to monitor the pattern for known stolen credentials in order to: (1) identify additional suspect internet protocol (IP) addresses and user identifications (IDs), (2) identify additional compromised credentials, (3) identify additional historical fraud that has not been identified to date and (4) possibly link multiple phishing sites to establish a combined or total loss on a single account that may have come through multiple sessions and/or channels on a particular case.

The system and method of the present invention is also directed to preventing fraud in the form of unauthorized attempts to access the account information of unknowing account holders such as customers of a financial institution. Fraud may be prevented by inhibiting hackers from identifying valid customer credentials and gaining access to information regarding the customer's accounts.

The system and method of the present invention attempts to achieve fraud detection and prevention by the creation and implementation of what is referred to herein as a "Blue List." A Blue List, as defined herein, is a list of compromised user identifications (IDs). A purpose of the Blue List is to exploit the fact that stolen credentials appear to go through multiple iterations as they are verified and sold across the black market. Once a user ID is identified as compromised, the system of the present invention monitors login requests for this user ID. If authentication is requested for a flagged user ID, the session is identified and an alert is sent to internal investigators unbeknownst to the user of the system. This realization of suspicious sessions assists a financial institution, for example, toward identifying additional credentials that have been compromised. In addition, it provides further information on IP addresses that are channeling fraud to a financial institution.

The Blue List is preferably housed in a table in a database. The Blue List table includes, but is not limited to, the following fields: user ID, create datetime, description, list type, case number, customer ID, prefix only, and allow login. The 'user ID' is the user ID or prefix to look for by the authentication service application 42. The 'create datetime' is the datetime that the user ID was added to the Blue List. The 'description' is a free form field that allows additional details about a particular user ID. The 'list type' distinguishes the entry between compromised credentials and phish phood which will be discussed herein in more detail. 'Case number' is used to link the user ID to the specific investigation or case being investigated. Typically, a case might include multiple customers who are thought to have fallen victim to the same fraud. 'Prefix' instructs the authentication services application to either perform a straight comparison or to look at the prefix of the ID. 'Allow login' allows the credentials to be authenticated, but will log and alert on the request. This provides an opportunity to enable a notion of a 'honey pot' account. This is a false account that holds actual money. By using real money, the entire fraud process can be followed to see, for example, where the money is going.

A feature of the Blue List is its reporting feature. On a regular interval, reports are generated to list out activity that is related to requests for access using Blue-listed IDs. These reports link all activity that originated from the same browser session. Given that the browser session identifier is generated to be globally unique, it can be used to reliably link multiple activities as having occurred within the same browser session. This allows the organization to find all authentications within a Blue-listed session as suspicious. Each customer identified within a Blue-listed session will be tracked by a fraud analyst to determine if the behavior of this authentication request is out of pattern for his or her normal activity. This is primarily based on the geo-location associated with this authentication, in addition to the relationship of that customer to the other customers within the shared session. This comparison can be used to gauge the amount of suspicion that should be associated with this session and the customers can be contacted for verification.

Thus, a feature that may be implemented for use with the Blue List includes a session ID. The session ID is a value that is synonymous with the session created by a browser when it is started. When a browser is closed, the session is terminated and a new session is generated when the browser is started again. All requests coming from an IP address do not have to be from the same session. The advantages of the session ID include, but are not limited to, a new browser session is not established with each request, and a session ID can be used to quickly link and identify suspicious activity.

Referring now to the figures, FIG. 1 illustrates the environment 10 in which the networked computer system of the present invention operates. As illustrated in FIG. 1, a user 12 presents its user identification (ID) and password credentials at a web interface 20. A user 12, for example, is a person, entity, device or computer. A web interface 20 is a means to access authenticated space. A web interface 20 includes, but is not limited to, a personal computer (PC), a personal data assistant (PDA), or any other device for accessing authenticated space such as a website or webserver. A firewall 25 may be present between the web interface 20 and the authenticated space for security purposes. The webserver 30 is present within the authenticated space. The webserver 30 typically comprises an html server 32 and a single sign-on (SSO)

service 34 such that a user 12 can authenticate once and have access to multiple computer software applications. The webserver 30 is communicatively connected to an application server 40.

In accordance with the present invention, the application server 40 looks for patterns within authentication attempts to try to identify unusual behavior. For example, in the case of an application network of a financial institution, it may use information from a request sent to identify a series or batch of logins for multiple customers from a single location. Once this pattern is identified, it interrupts the ability for the requester to make additional automated (batch) calls into the financial institution's internet presence. Also, a financial institution may monitor a series of internet protocol (IP) addresses to prevent traffic originating from those IP addresses from accessing authenticated space. Further, a financial institution may monitor a list of known compromised credentials to identify additional victims of an attack.

In accordance with the present invention, the application server 40 typically comprises a computer software application(s). Among the computer software applications residing on the application server 40 is an authentication services (log-in) application 42, an identity manager application 44, and a message/transport or navigation application 46. The application server 40 is communicatively connected to a database server 50. The database server 50 comprises a database computer software application 52 and an authentication database 54. An example of a commercially available database computer software application is an Oracle database from Oracle Corporation. The Blue List 56 is monitored by the authentication services application 42 and identity manager application 44.

The message/transport application 46 of the application server 40 is communicatively connected to the log manager 60. An example of a commercially available message/transport application is WEBSPHERE® MQ from IBM Corporation. The log manager 60 is a computer software application that handles the logging of user activity for the applications. The transactions and events that occur within the applications are written to a queue by the authentication services and identity manager application 42. The log manager 60 retrieves messages off of the queue and creates entries into a log database 62.

The authentication services application 42 is the primary computer software application that authenticates a user 12 such as a customer of a financial institution who is accessing online computer software applications of the financial institution. The authentication services application 42 comprises logic that recognizes patterns commonly seen with attacks on the interne presence. The authentication service application 42 maintains information about authentication requests as they occur.

In accordance with the system and method of the present invention, when a user ID is identified as being compromised, the authentication services application 42 sends an alert to add the user ID to the Blue List 56 if fraud has occurred. Since there is customer impact because requests for authentication of a Blue-listed ID are given an invalid credentials error message, fraud comments are added to the user's records at the financial institution prior to being put on the Blue List. This provides a financial institution with the information needed to identify a call that requires special handling, even though the error being referenced in the call is generic. It is preferable to place fraud comments on a user's account before an entry is made onto the Blue List to ensure that the financial institution, for example, may properly service a call on the account. The advantages of a Blue List include, but are not limited to, tracking additional credentials that are being used to commit fraud by linking them together in browser sessions; tracking credentials previously used to commit fraud across new IP addresses; and identifying malware that may be applied to victim's devices through a phishing website.

The identity manager computer software application 44 includes logic to verify requests through the consultation of the Blue List. All credential maintenance requests where a user ID is entered for identification are checked against the Blue List. New credentials selected by a customer who is wanting online access may consist of a user ID that is in conflict with a Blue-listed ID. Thus, for credential issuance, the Blue List is checked by the identity manager application 44 to prevent a user 12 from aligning his credentials with one of the values that are on the Blue List. Before assigning a new user ID to a user 12, the identity manager application 44 verifies that the chosen user ID is not on the Blue List. In the case where a user 12 requests a user ID that is not on the Blue List, but has already been assigned to a customer, the identity manager application 44 does not recommend a Blue-listed ID.

Thus, a preferred feature of the system and method of the present invention is that when a customer is enrolling for access into online applications, he or she is asked to select a user ID and password. It is critical that the customer does not choose a user ID that is already in use or is in conflict with an identifier on the Blue List. This means that the user ID cannot match a user ID that has been in use by another user and was compromised such as because it was stolen. This is important for at least two reasons. First, it is important to allow the authentication systems to uniquely identify an attempt with a Blue-listed ID as an attempt on a previously compromised account. Second, it is important to keep fraudsters from knowing any valid user IDs. If a customer were to re-enroll with a Blue-listed ID, a fraudster would automatically have half of the customer's credentials in his or her possession.

Thus, the identity manager application 44 handles a request by a customer for a user ID that is in conflict with a Blue-listed ID as follows. When a customer accesses the website enrollment pages, he or she will enter a user ID that is preferable for his or her use. The identity manager application 44 checks this requested user ID against the Blue List to see if it exists there. If the user ID is on the Blue List, the customer will receive an error message stating that the credential cannot be used. The customer will be asked to choose another identifier. If the user ID is not on the Blue List, the identity manager application 44 compares the requested user ID against other user IDs that are in use by the customer base. If the user ID is already in use, the customer receives the same message as is given if the user ID is on the Blue List. If the user ID is not in use, the user ID is assigned to the user and he or she will use it for future authentications to the online computer software applications. Thus, a customer is not assigned a user ID that is on the Blue List.

Another inventive feature of the system and method of the present invention is the creation of a second category of user IDs referred to herein as 'phish phood.' Phish phood is a category of fabricated user IDs that are present on the Blue List.

According to the method of the present invention, a prefix is assigned to a fabricated user ID to identify it as phish phood on the Blue List. Preferably, the prefixes have a unique identifier appended to them in order to track specific events. For example, a financial institution may want to track a phishing expedition at a specific phishing website. The financial institution accesses the phishing website and enters the phish phood (i.e. the fabricated user ID and password). The submission of the false credentials into a phishing site is preferably made from a 'control' machine. The hard drive of that device is preferably evaluated to determine if malware such as a Trojan or keylogger was distributed by the phishing website. Thus, the phish phood is used to bait the phishing site.

The financial institution then monitors to see if a user makes a request for authentication at the website of the financial institution using the phish phood. The authentication services application 42 is able to monitor for authentication requests for the phish phood used as bait. When the authentication services application 42 detects a login attempt with phish phood, access is denied and an alert is distributed to inform the financial institution to research the session.

Among the advantages of the phish phood feature of the present invention is to provide an offensive approach to track "phishing" and reduce the impact of internet compromise. Thus, for example, a financial institution, can monitor the device used to access the phishing site to determine if malware was distributed by the phisher. Additionally, when a fraudster attempts to authenticate with the phish phood, a financial institution can track the internet service provider (ISP) as well as identify other credentials contained in the same browser session.

With reference to FIG. 1, before assigning a new user ID to a user 12, the identity manager application 44 verifies that any 'phish phood' prefixes are not included within a chosen user ID. A user ID should not have a prefix that matches a 'phish phood' prefix. Thus, the phish phood function of the system and method of the present invention is shared between the authentication services application 42 and the identity manager application 44.

Figure 2:
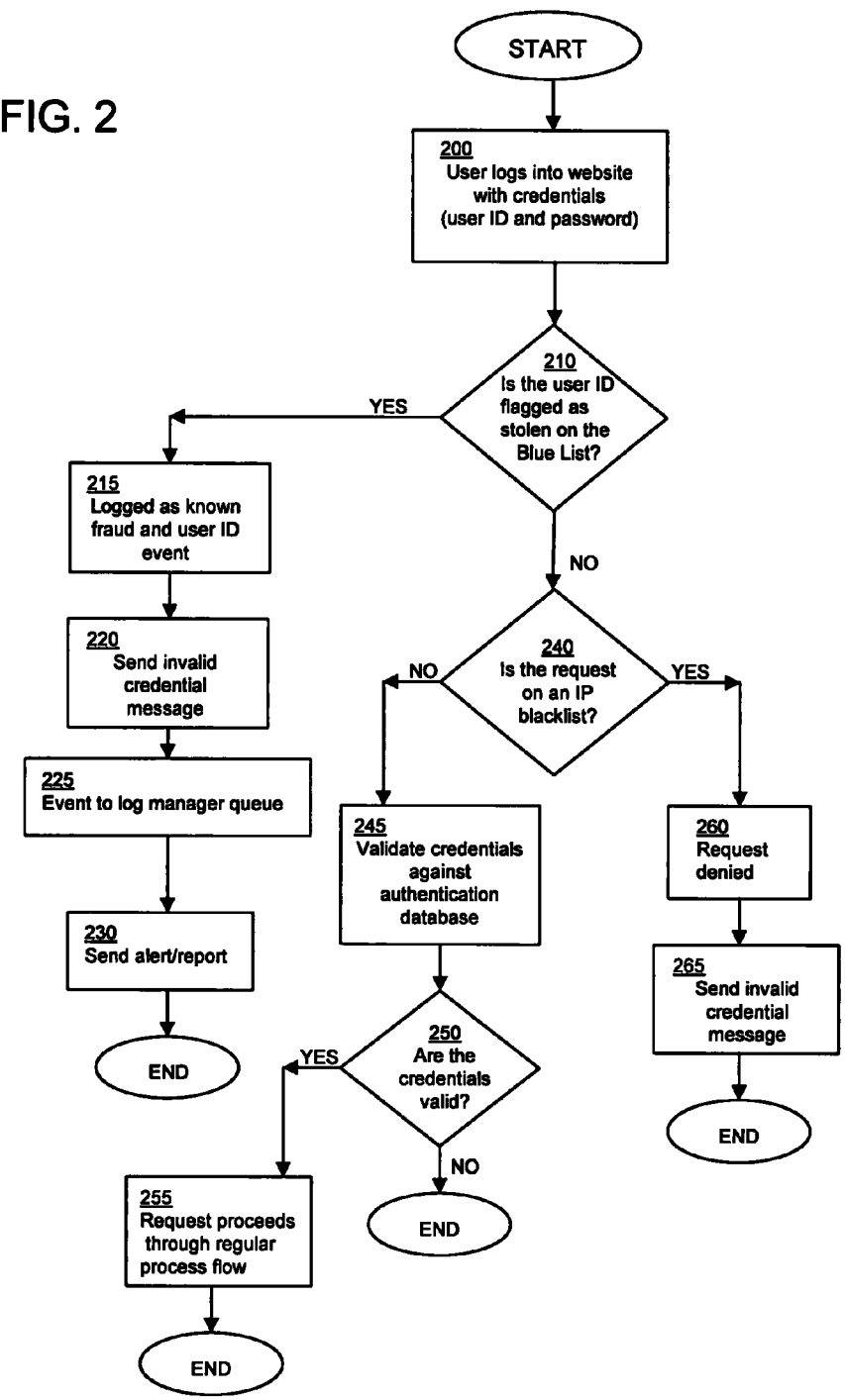
FIG. 2 is a flowchart illustrating process flow after a request for authentication by a user presenting a user ID and password in accordance with the present invention.

FIG. 2 illustrates the process flow from the perspective of the authentication services application 42 of a request for authentication by a user in accordance with the system and method of the present invention. A user 12, as show in FIG. 1, logs into a website through a web interface 20 with his or her credentials comprising a user identification and password (step 200). Before authenticating the customer, the user ID is compared against the Blue List to see if this ID is known to have been stolen or compromised (step 210). If the user ID is on the Blue List, it is logged as a known fraud and user ID event. (step 215). Once logged as a known fraud and user ID event, the request is denied access with an invalid credentials error message (step 220). A representative error message of this type is, "You have entered an invalid user ID and/or password. Please try again or for further assistance use one of the links below." Thus, the verbiage of the error indicates that the credentials are invalid, in hopes that the fraudster will attempt to authenticate with his complete list of compromised credentials, unaware that his requests are being blocked. Forensic data about the hardware device requesting access is collected and logged with the log manager queue (step 225).

An alert of probable criminal activity occurring through the online applications of the financial institution is then sent for fraud prevention purposes (step 230). To accomplish this, the authentication service application 42 writes an alert with text starting with a predefined prefix or message to the log manager queue. While retrieving and processing messages off of the queue, the log manager recognizes the text starts with this phrase, indicating that it requires special processing. The log manager gathers the email addresses to receive the alert. A connection establishes with an SMTP (Send Mail Transfer Protocol) server and the alerts are distributed. The message is logged and then it is removed from the queue.

When the authentication services application 42 consults the Blue. List for the user ID entered and looks to see if the user ID is flagged as stolen (step 210), if a match is made with a user ID of type 'phish phood', a new event of type phish phood is logged with an appropriate alert being distributed.

Reports are created to help analyze the activity. Reports are generated from the database server. A daily report is typically generated to exploit browser sessions where the fraudster has changed IP addresses. Reports are generated for events including, but not limited to, a compromised user ID, and phish phood.

If user ID is not on the Blue List, the IP address for the originating request is compared against an IP blacklist (step 240). An IP blacklist is another list which comprises IP addresses (in contrast to user IDs) that are known to be associated with fraud. If the IP address is on the IP blacklist, the request is denied (step 260) and the user receives an error message stating that the credentials presented are invalid (step 265). Once again, this hides from the user that the information is being used to help dictate authorization to authenticated space.

If the IP address is not on the IP blacklist, the credentials are validated against the authentication database (step 245). A check is then made to see if the credentials are valid (step 250). If the credentials are valid, the request is allowed to proceed through its regular process flow and the user is navigated to his or her intended destination (step 255).

There are numerous advantages associated with the system and method of the present invention. An advantage of the system and method of the present invention is that it identifies fraudulent requests coming into online computer software applications in a networked computer system. In addition, it identifies customers who are not aware that they have had account access compromised. It also identifies the origination of fraudulent requests to be fed into additional prevention processes. Other advantages of the system and method of the present invention include, but are not limited to, the ability to identify additional victims by tracking credentials that are known to have been compromised; to identify additional suspicious IP addresses being used for fraud; to identify malware that may be used by phishers through the use of phish phood; to reduce the number of customers affected by currently known hacking techniques; and to allow a financial institution a quick response to threats being leveraged against it.

Prophetic Example

Alert Notification Message

If the request is on behalf of a user ID that is on the Blue List, one of two events are written to the central log, depending on the list type. The event is either "compromised user ID" or "phish phood" based on the type of credential entered. This event triggers an alert, similar to one of the following examples.

Subject: COMPROMISED USERID
KNOWN COMPROMISED USERID FOUND. THE FOLLOWING SESSION REQUIRES FURTHER RESEARCH.
TIME: 2007-06-25 9:30:37.0
APPLICATION: AUTHENTICATION SERVICES
FINGERPRINT: MOZILLA/4.0 (COMPATIBLE; MSIE 6.0; WINDOWS NT 5.1; SV1) HTTP/1.1LNG= RU&PLT=WIN32&BN=MSIE&BV=6.0&ASW= 1024&ASH=738&CD=32
REMOTEHOST: 213.255.201.14
SESSIONIP: 213.255.201.14
SESSIONID: 4N.HE5THBDWFZ8SMYGMXKT6GARR.1222775
ISP REPORT
ISP: STEAM BROADCASTING CITY: LAGOS
REGION: NIGERIA
COUNTRY: AFRICA
Subject: PHISH PHOOD
ACTIVITY FOR A CREDENTIAL FABRICATED TO TRACK FRAUD HAS BEEN REQUESTED. THE FOLLOWING SESSION REQUIRES FURTHER RESEARCH.
TIME: 2007-06-25 9:30:37.0
APPLICATION: IDENTITY MANAGER
FINGERPRINT: MOZILLA/4.0 (COMPATIBLE; MSIE 6.0; WINDOWS NT 5.1; SV1) HTTP/1.1LNG=RU&PLT=WIN32&BN=MSIE&BV=6.0&ASW=1024&ASH=738&CD=32
REMOTEHOST: 213.255.201.14
SESSIONIP: 213.255.201.14
SESSIONID: 4N.HE5THBDWFZ8SMYGMXKT6GARR.1222775
ISP REPORT
ISP: STEAM BROADCASTING
CITY: LAGOS
REGION: NIGERIA
COUNTRY: AFRICA It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method for detection and prevention of computer fraud in a computer network comprised of a webserver, an application server having an identity manager application, and a database server having a database application and an authentication database,
wherein the webserver, application server and database server are communicatively connected to one another, the method comprising:
receiving by the application server, from a user using a web interface, a request to assign a proposed user identification to the user during a browser session,
checking by the identity manager application of the application server the proposed user identification against a list of compromised user identifications stored in a table of the authentication database to verify that the proposed user identification is not on the list, and
assigning by the identity manager application the proposed user identification to the user provided it is not on the list of compromised user identifications.

2. The method according to claim 1, wherein the computer network is of a financial institution.

3. The method according to claim 1, wherein the user is a customer of the financial institution.

4. A method for detection and prevention of computer fraud in a computer network comprised of a webserver, an application server having an identity manager application, and a database server having a database application and an authentication database,
wherein the webserver, application server and database server are communicatively connected to one another, the method comprising:
receiving a request for access to the webserver from a user providing a user identification during a browser session,
checking by the identity manager application of the application server the provided user identification against a list of compromised user identifications stored in a table of the authentication database,
tracking other access attempts made within the browser session to identify other compromised credentials, the browser session remaining open to ensure tracking is during same browser session, and
adding any other identified compromised credentials to the list of compromised user identifications.

5. The method according to claim 4, wherein the list of compromised user identifications is stored on a computer.

6. The method according to claim 4, further comprising monitoring credentials used to commit fraud across a series of interne protocol addresses.

7. A method for detection and prevention of computer fraud in a computer network comprised of a webserver, an application server having an identity manager application, and a database server having a database application and an authentication database,
wherein the webserver, application server and database server are communicatively connected to one another, the method comprising:
fabricating by a first party a user identification, and
adding by the first party the fabricated user identification to a list of compromised user identifications,
storing the list in a table of the authentication database, and
monitoring fraudulent use of the fabricated user identification in a browser session to link other compromised credentials used in the same browser session, the browser session remaining open to ensure monitoring is during the same browser session.

8. The method according to claim 7, further comprising assigning a prefix to the fabricated user identification.

9. The method according to claim 7, further comprising appending a unique identifier to the fabricated user identification.

10. The method according to claim 7, further comprising entering by the first party the fabricated user identification in a website not of the first party.

11. The method according to claim 7, further comprising monitoring by the first party a request by a second party for access to a website of the first party using the fabricated user identification.

12. The method according to claim 11, further comprising denying access to or tracking the second party via a web browser session to identify additional compromised credentials.

13. The method according to claim 10, wherein the website is a phishing website.

14. A computer system for detection and prevention of computer fraud, the computer system comprising:
a web interface for providing access to a financial account to a user,
a web server communicatively connected to the web interface,
a database server having a database application and an authentication database, and an application server for receiving from the user a request to assign a proposed user identification to the user, the application server having an identity manager application for checking the proposed user identification against a list of compromised user identifications stored in a table of the authentication database to verify that the proposed user identification is not on the list, and for assigning the proposed user identification to the user provided it is not on the list of compromised user identifications.

15. The system according to claim 14, wherein the list further comprises a fabricated user identification.

16. The system according to claim 14, wherein the list of compromised user identifications is associated with at least one financial account.

17. The system according to claim 14, wherein the webserver is of a financial institution.

18. A computer system for detection and prevention of computer fraud, the computer system comprising:
   a web interface for providing access to a financial account to a user,
   a web server communicatively connected to the web interface,
   a database server having a database application and an authentication database, and
   an application server for receiving a request for access to the web server from the user providing a user identification during a browser session, the application server having an identity manager application for checking the provided user identification against a list of compromised user identifications stored in a table of the authentication database and for tracking other access requests made during the browser session using compromised user identifications, the browser session remaining open to ensure tracking is during the same browser session.

19. The system according to claim 18, wherein the list further comprises a fabricated user identification.

20. The system according to claim 18, wherein the list of compromised user identifications is associated with at least one financial account.

21. The system according to claim 18, wherein the web server is of a financial institution.

22. A method for detection and prevention of computer fraud in a computer network comprised of a webserver, an application server having an identity manager application, and a database server having a database application and an authentication database,
   wherein the webserver, application server and database server are communicatively connected to one another, the method comprising:
   receiving by the application server, from a user using a web interface, a request to assign a proposed user identification to the user during a browser session,
   checking by the identity manager application of the application server the proposed user identification against a list of compromised user identifications stored in a table of the authentication database to verify that the proposed user identification is not on the list,
   assigning by the identity manager application the proposed user identification to the user provided it is not on the list of compromised user identifications, and
   monitoring credentials used to commit fraud by linking other credentials used in the browser session, the browser session remaining open to ensure tracking is during same browser session.

23. The method according to claim 22, further comprising monitoring credentials used to commit fraud across a series of internet protocol addresses.

24. A method for detection and prevention of computer fraud in a computer network comprised of a webserver, an application server having an identity manager application, and a database server having a database application and an authentication database,
   wherein the webserver, application server and database server are communicatively connected to one another, the method comprising:
   receiving a request for access to a webserver from a user providing a user identification during a browser session,
   checking by the identity manager application of the application server the provided user identification against a list of compromised user identifications stored in a table of the authentication database,
   monitoring credentials used to commit fraud by linking other credentials used in the browser session, the browser session remaining open to ensure same browser session and
   adding any linked credentials to the list of compromised user identifications.

* * * * *